Dec. 5, 1967 E. R. JONES, JR 3,356,949

BY-PASS VOLUME CONTROL CIRCUIT FOR CLOCK RADIOS

Filed April 13, 1964

INVENTOR.
Ellis R. Jones Jr.
BY
Brown Jackson Boettcher & Dienner
ATTYS.

United States Patent Office 3,356,949

Patented Dec. 5, 1967

3,356,949

BY-PASS VOLUME CONTROL CIRCUIT FOR CLOCK RADIOS

Ellis R. Jones, Jr., Chicago, Ill., assignor of one-half to Ellis R. Jones, Cave Creek, Ariz., and Carl Schulz, Wilmette, Ill.

Filed Apr. 13, 1964, Ser. No. 359,204

8 Claims. (Cl. 325—396)

ABSTRACT OF THE DISCLOSURE

A control circuit for use with a radio receiver to selectively vary the volume of the receiver during a first playing period while allowing increased volume during a second playing period. The control circuit includes a variable resistor and a switch adapted to selectively connect the resistor to the receiver volume control for establishing a first volume output and subsequently to disconnect the resistor to allow a greater volume output.

Figure 1:
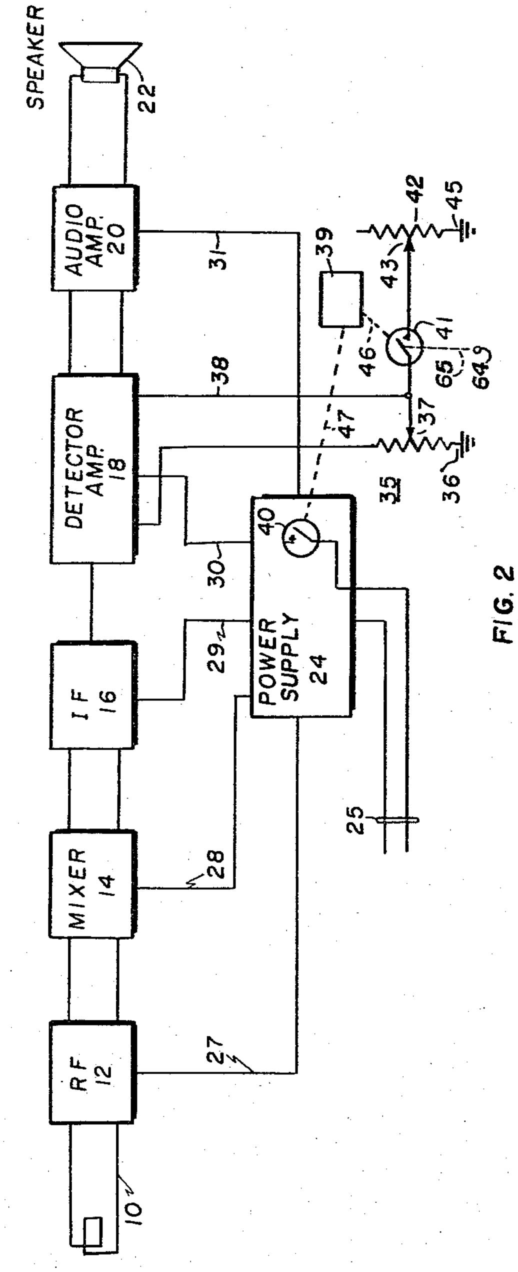

This invention relates to automatically controlled signal receivers and, more particularly, to radio receivers adapted to be controlled by clock operated means.

In clock controlled radio receivers, the radio is frequently arranged to be turned on by the clock so that the operator is awakened by music rather than by an alarm. Further, these types of radios are frequently employed in the evening to monitor music during a "slumber" period at end of which the clock turns the radio off. The radio is also provided with manual controls for turning on and off the radio independently of the clock. Generally, the listener prefers to employ a lower volume setting for the "slumber" program than for the "wake-up" or alarm program the following morning.

Previously, attempts have been made to solve this problem of automatically obtaining different volume settings by employing relatively complex mechanical means and also relatively complex electrical circuits. One of these devices is disclosed in Miller Patent No. 2,876,-344 issued Mar. 3, 1959.

Accordingly, it is an object of this invention to provide an improved control system for a radio receiver.

It is another object of this invention to provide a simple clock operated control system for a radio receiver.

Yet another object of this invention is to provide a simple circuit which can be added to any of the conventional clock radio devices to provide for a low volume lullaby program and a higher volume wake-up program.

It is a further object of this invention to provide an inexpensive, simple and easily installed clock operated control system for a radio receiver which obviates the above-mentioned disadvantages.

Briefly, in accordance with aspects of this invention, I provide, on a conventional, clock controlled radio receiver having a slumber or lullaby control, an additional volume control or variable potentiometer and an added switch which is manually closed by the lullaby control and which is opened by the clock mechanism, which switch effectively connects the added potentiometer in parallel with the existing potentiometer during periods when it is desired to reduce the volume of the signal. When the clock mechanism turns off the radio by opening the power switch at the end of the predetermined lullaby period, the clock mechanism also opens the added switch to disconnect the added volume control. Because the lullaby switch must be manually closed, the control switch remains open during the subsequent wake-up period even though the clock mechanism closes the power switch. Thus the radio automatically delivers an increased output signal during this subsequent wake-up period in comparison to the slumber period signal.

In accordance with more specific aspects of this invention, I employ a second variable potentiometer, one terminal of which is connected to ground and one additional clock-operated switch on the lullaby control connected between the variable tap of the added-potentiometer and the variable tap of the existing volume controlling poteniometer. With this novel arrangement, when the lullaby control is manually operated the added switch is closed, an audio signal is fed from the detector to the regular, or first, volume control; a portion of this signal is fed from the variable tap of the first volume control to the grid of the first audio amplifier; and, a portion of this audio signal is by-passed to ground through the added switch contact and the added, or second, volume control. The amount of audio signal by-passed to ground determines by what factor the output from the speaker is reduced when the added switch contact is closed. The amount of signal by-passed may be controlled by manually setting the second potentiometer. Further, the level of the wake-up signal is controlled by manually adjusting the the first, or conventional volume control. Advantageously, the second, or added, potentiometer may have the same value of resistance between its fixed terminals as the resistance of the first potentiometer between its fixed terminals. For example, they may both be one meg-ohm potentiometers or they may both be two meg-ohm potentiometers. The clock advantageously controls the switch in a manner to maintain the switch in a closed position during a slumber period in which it is desired to reduce the volume of the output signal and, at the end of this slumber period, the clock opens the power switch to turn the radio off and also opens the switch to the additional potentiometer. To initiate the following wake-up period, the clock turns the radio on by closing the power switch. The added switch, which controls the added volume control is on the lullaby control which must be manually operated and therefore remains in the open position to give an increased volume for the wake-up program.

Figure 2:
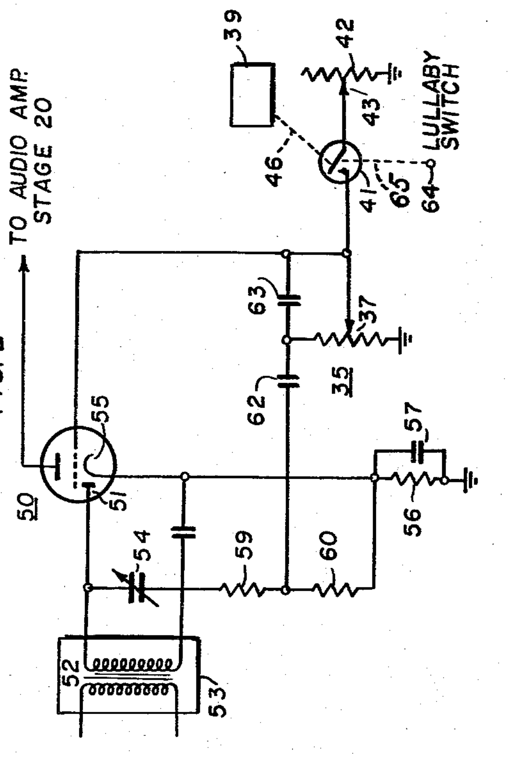

These and various other objects and features of the invention will be more clearly understood from a reading of the detailed description of the invention in conjunction with the drawing in which:

FIGURE 1 is a combined block and schematic diagram of one illustrative embodiment of this invention; and FIGURE 2 is a schematic representation of a portion of the embodiment of FIGURE 1.

Referring now to FIGURE 1, there is shown in combined schematic and block form an illustrative embodiment of the superheterodyne type radio receiver employing this invention. The receiver includes a loop-type antenna 10 which is coupled to a radio frequency section 12, the output of which is coupled to a well known mixer type section 14. The output of the mixer section 14 is fed to an intermediate frequency amplifier stage 16 and the output of this intermediate frequency amplifier stage is fed to a detector stage 18. The output of the detector stage 18 is fed to an audio amplifier stage 20. The output of the audio amplifier stage 20 is fed to a speaker 22. A suitable power supply 24 is provided for converting the alternating current power supplied by way of a cord 25 to direct current power and for supplying this power to the respective stages 12, 14, 16, 18 and 20 through suitable leads 27, 28, 29, 30 and 31, respectively. The receiver includes a conventional variable resistor volume control 35, one end of which is connected to a source of reference potential such as ground at 36, which volume control includes a variable tap 37. The variable tap is connected to a grid of a first audio amplifier in the detector stage by means of a conductor 38 in a manner which will be subsequently described in detail. The radio may be provided with a clock mechanism 39 which is preferably electric and is connected to the power supply 24 to receive alternating current therefrom and may be connected to a suitable power switch 40 in the power supply 24 to turn the power on and off at predetermined times. All of the previously described sections are of the conventional type well known in the art, reference being made, for example, to Terman Radio Engineering, 2nd edition, p. 554, etc.

In order to adapt this receiver to provide a reduced volume output for a lullaby period in which the listener is expected to be lulled to sleep by music and to modify this volume level for wake-up service at increased volume, I provide an additional clock controlled switch 41 which, advantageously, is a single pole, single throw switch which is manually closed by the lullaby knob 64, and is opened by means of the clock mechanism 39 when the clock mechanism 39 opens the power switch 40. I also provide a second, or additional potentiometer 42 and switch 41 is connected to a variable tap 43 of the second potentiometer 42. The second potentiometer 42 is also connected to ground as indicated at 45. The clock mechanism 39 includes mechanical means indicated by a dotted line 46 for opening the switch 41 at the end of a predetermined period. As previously mentioned, the clock mechanism 39 also is coupled to switch 40 for turning off the power supply 24 at predetermined times and for turning on the power supply at certain other predetermined times, which coupling is indicated by a dotted line 47. For example, operation of the lullaby control 64 sets the clock mechanism 39 to maintain the power supply energized from the source connected through the cord 25 for a predetermined lullaby period during which period the clock mechanism 39 also maintains the switch 41 in a closed position. Thus, the variable potentiometers 35, 42 are connected in parallel and the level of the audio signal fed through the audio amplifier 20 to the speaker 22 is reduced.

Assume for the purposes of this explanation that the lullaby period is forty-five minutes and is started at 10 p.m. by setting the clock mechanism 39 and manually operating the lullaby knob to close switch 41. At 10:45 p.m., the clock mechanism 39, through its mechanical linkage 47, opens the power switch 40 and interrupts the power to the power supply 24 and also opens the switch 41. Thus, the receiver is now in a condition in which operation of the clock mechanism 39 and the activation of power switch 40 through the mechanical linkage 47 will again energize the power supply 24 and turn on the receiver. The next succeeding period of operation of the receiver will be a wake-up period because the clock mechanism 39 cannot close the switch 41 but permits the switch to remain in its open position to thus give an increased level of volume through the audio amplifier 20 to the speaker 22.

Referring now to FIGURE 2, there is depicted, in schematic form a portion of the embodiment of FIGURE 1. As shown in FIGURE 2, a second detector, first audio frequency amplifier tube 50 has a detector diode 51 coupled to a secondary winding 52 of an IF transformer 53 and a variable capacitor 54 which tunes the secondary 52. A cathode 55 in the tube 50 is coupled to ground through a resistor 56 which is by-passed by an audio by-pass capacitor 57. A voltage divider is connected between winding 52 and resistor 56, which divider includes a pair of serially connected resistors 59, 60. A coupling capacitor 62 is coupled between the junction of resistors 59, 60 and the conventional volume control 35. A coupling capacitor 63 is connected between capacitor 62 and the variable tap 37 of volume control 35 to improve the frequency response curve. The clock mechanism 39 is shown mechanically linked to the additional switch 41, as indicated by dotted line 46, for the purpose of opening switch 41 and the lullaby control 64 is connected to close switch 41 as indicated by the dotted line 65.

From this block and schematic representation of FIGURE 1 and the schematic representation of FIGURE 2, it is apparent that when the switch 41 is opened by the clock mechanism 39, the variable potentiometer 42 is disconnected and the receiver is operating with its conventional potentiometer 35 controlling the volume. If, however, the lullaby control switch 41 is operated to close for the operation of the receiver during a lullaby period, the potentiometer 42 and, specifically, the variable tap 43 is connected to the variable tap 37 of the potentiometer 35. Thus, the volume controls are effectively connected in parallel by-passing a part of the audio signal to ground through potentiometer 42. For the subsequent wake-up periods, however, the switch 41 is open as a result of the operation of the clock mechanism 39 such that the receiver operates at an increased, or wake-up, volume level with only its normal volume control 35 in the circuit.

The foregoing explanation illustrates how an existing clock controlled radio may be quickly and inexpensively modified to provide a low volume level lullaby program and an automatically controlled higher volume level wake-up program. Because of the manner in which the additional switch and additional volume control are connected in the radio circuit, any failure of these added components will not interfere with the operation of the radio circuit.

While I have shown and described one illustrative embodiment of this invention, it is understood that the concepts thereof may be employed in other embodiments without departing from the spirit and scope of this invention.

What is claimed is:

1. An automatically controlled radio receiver including:
   volume control means;
   clock means including a switch coupled to said volume control means; and
   resistance means coupled in parallel with said volume control means by said switch whereby the operation of said clock means disconnects said volume control means from said resistance means.

2. In an automatically controlled radio receiver,
   a first volume controlling potentiometer;
   a second volume controlling potentiometer;
   a clock mechanism; and
   switch means for selectively connecting said second potentiometer in parallel with said first potentiometer to reduce the volume level of said receiver during predetermined periods, said clock mechanism including means coupled to said switch means for opening said switch means after a predetermined period.

3. In an automatically controlled radio receiver, the combination comprising:
   a first volume controlling impedance;
   a second volume controlling impedance;
   switch means for selectively connecting said second impedance in parallel with said first impedance; and
   clock means for disconnecting said switch means after a predetermined period of time to increase the volume level of said receiver after said predetermined period.

4. In an automatically controlled signal receiver, the combination comprising:
   detector means coupled to receive a radio frequency signal and to develop an audio frequency signal from said radio frequency signal;
   first volume control means coupled to said detector means;
   switch means connected to said volume control means; and
   second volume control means adapted to be connected in parallel with said first volume control means by said switch means; and
   clock means for opening said switch means to disconnect said second volume control means to increase the volume level of said receiver.

5. In a clock controlled radio, the combination comprising:

a clock mechanism;

a detector stage in said radio and including a volume control having a variable tap thereon;

switch means coupled to said volume control and to said clock mechanism to be opened by said clock mechanism; and a second volume control coupled to said switch means and to a by-pass path whereby operation of said switch means couples said second volume control to said first volume control to by-pass a portion of the audio signal through said by-pass path to reduce the volume of the output signal of the radio.

6. In a clock controlled radio, the combination comprising:

a clock mechanism;

power supply means;

first switch means coupled to said clock mechanism for controlling the application of power to, and the disconnection of power from, said power supply means;

detector means for detecting the audio frequency energy from a radio frequency signal;

volume control means coupled to the output of said detector means and including a variable tap;

a first audio frequency amplifier coupled to said variable tap;

second switch means coupled to said clock mechanism and to said variable tap; and resistance means coupled to said second switch means whereby operation of said first switch means by said clock mechanism energizes said radio to operate at a first volume level and operation of said first and said second switch means energizes said radio and connects said resistance means in parallel with said volume control means to operate said radio at a lower volume level than said first volume level.

7. In a clock controlled radio, the combination comprising:

a clock mechanism;

power supply means;

first switch means coupled to said clock mechanism for controlling the application of power to, and the disconnection of power from, said power supply means;

detector means for detecting the audio frequency energy from a radio frequency signal;

volume control means coupled to the output of said detector means and including a variable tap;

second switch means coupled to said variable tap and including lullaby control means for closing said switch means and means coupled to said clock mechanism for opening said second switch means when said clock mechanism controls said first switch means to disconnect the power from said power supply means; and second volume control means including one terminal coupled to a by-pass path and a variable tap coupled to said second switch means.

8. In a clock controlled radio, the combination comprising.

means for receiving a radio frequency signal;

means for converting said signal to an intermediate frequency signal;

detector means including an anode coupled to said converting means for detecting the audio frequency signal on said intermediate frequency signal;

volume control means including a variable resistor having one terminal coupled to ground, another terminal coupled to said anode and a variable tap;

a first audio frequency amplifier having one electrode coupled to said tap;

variable impedance means having one terminal coupled to ground and a variable coupling;

manually operable lullaby switch means for connecting said variable coupling to said variable tap;

power supply means including a power switch for controlling the application of power to said power supply; and clock means coupled to said manually operable switch means and to said power switch for controlling the opening of said power switch and said switch means and for controlling the subsequent closing of said power switch whereby said manually operable switch may be manually closed when said power switch is closed to by-pass a portion of the audio frequency signal to provide an output signal of a first volume and said clock means will open said power switch and said switch means and will subsequently close said power switch to provide an output signal of a greater volume than said first volume.

References Cited

UNITED STATES PATENTS 2,876,344 3/1959 Miller ............ 325—296

KATHLEEN H. CLAFFY, *Primary Examiner.*

R. LINN, *Assistant Examiner.*